Dec. 14, 1965 H. W. DIETERT ETAL 3,222,736
PROPERTIES CONTROLLER FOR GRANULAR MATERIAL
Filed July 9, 1962 3 Sheets-Sheet 1
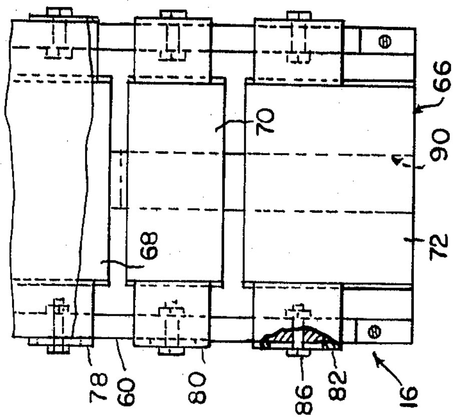
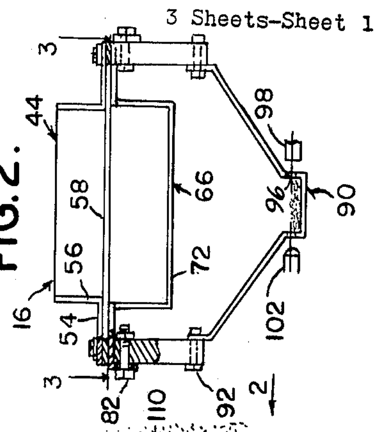
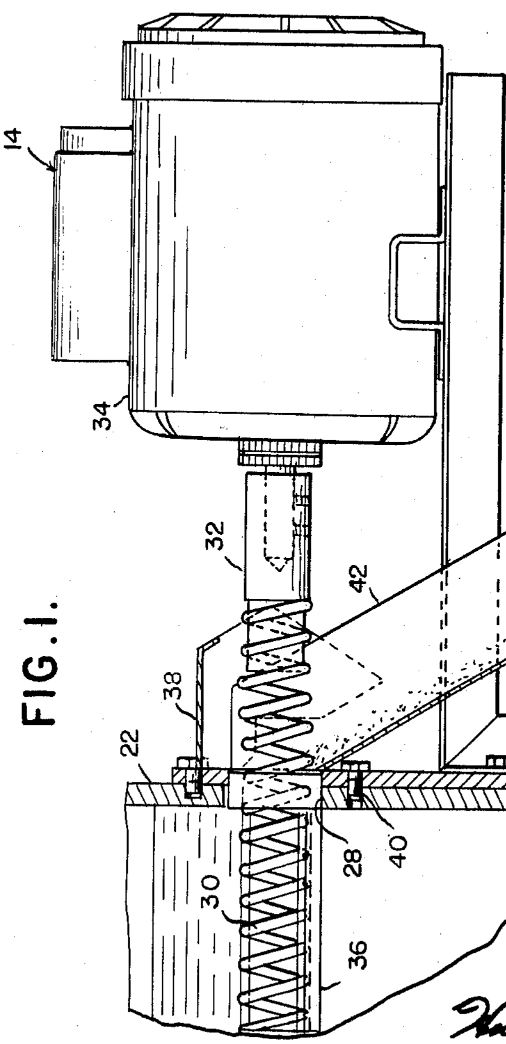
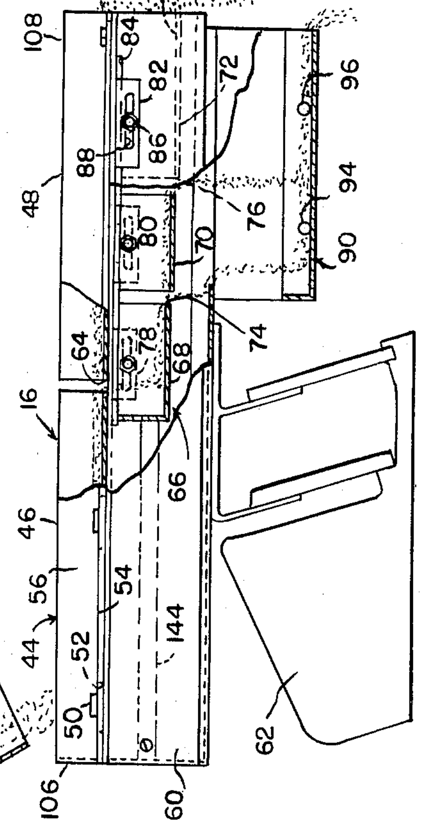
INVENTORS
HARRY W. DIETERT
HOWARD L. JAMESON
RANDOLPH L. DIETERT
THOMAS H. HANNA
ALEANDER L. GRAHAM
RALPH E. STEINMUELLER
BY Whittemore Hulbert & Belknap
ATTORNEYS INVENTORS
HARRY W. DIETERT
HOWARD L. JAMESON
RANDOLPH L. DIETERT
THOMAS H. HANNA
ALEXANDER L. GRAHAM
RALPH E. STEINMUELLER BY Whittemore Hulbert & Belknap ATTORNEYS PROPERTIES CONTROLLER FOR GRANULAR MATERIAL
Filed July 9, 1962 3 Sheets-Sheet 3
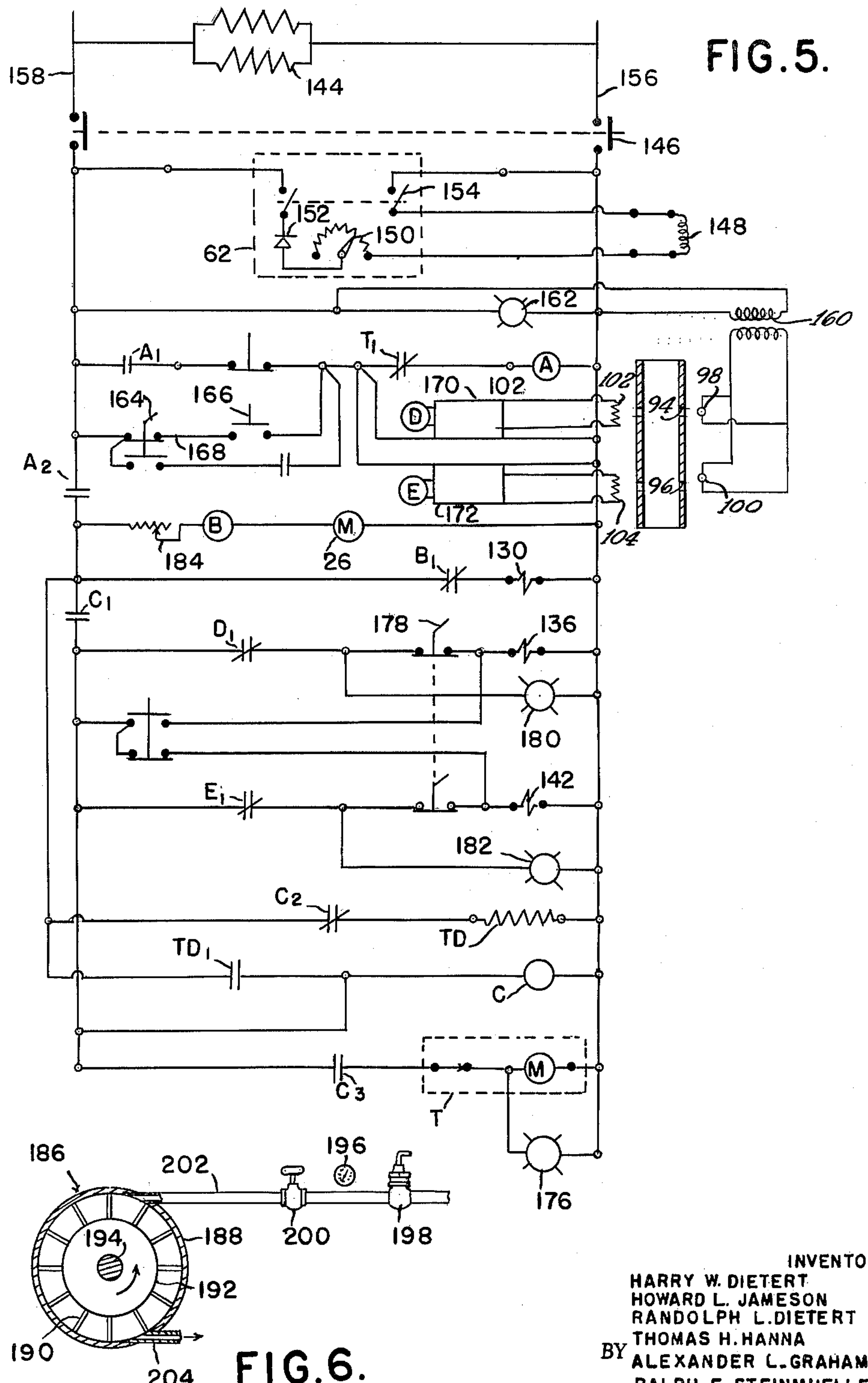
INVENTORS
HARRY W. DIETERT
HOWARD L. JAMESON
RANDOLPH L. DIETERT
THOMAS H. HANNA
BY ALEXANDER L. GRAHAM
RALPH E. STEINMUELLER
Whittemore Hulbert & Belknap ATTORNEYS 3,222,736
Patented Dec. 14, 1965

3,222,736

PROPERTIES CONTROLLER FOR GRANULAR MATERIAL

Harry W. Dietert, Kerrville, Tex., Howard L. Jameson, Livonia, Randolph L. Dietert and Thomas H. Hanna, Detroit, Alexander L. Graham, Livonia, and Ralph E. Steinmueller, Detroit, Mich., assignors to Harry W. Dietert Co., Detroit, Mich., a corporation of Michigan Filed July 9, 1962, Ser. No. 208,442
9 Claims. (Cl. 22—89)

The present invention relates to conditioning granular material and refers more specifically to apparatus for controlling the moldability of granular material such as foundry sand including adjustable slot structure for separating a sample of the material into portions in accordance with the moldability thereof, improved sample feed mechanism and means for compensating for the relatively short travel of a sample of granular material in the adjustable slot structure as compared to the distance of travel of the tranular material between conditioning apparatus therefor and the place of use thereof.

In the past apparatus for controlling moldability of granular material has been known wherein a sample of the granular material has been separated by means of a vibrated screen into portions representative of the moldability of the granular material which portions when compared in accordance with the formula $$\frac{A}{A+B}\times 100$$

where A is the portion of the grandular material passing through the screen and B is the portion of material retained on the screen during vibration, provides a moldability number or index. Such apparatus has in the past included some means for feeding a sample of granular material onto a vibrating screen at one end and means at the other end of the vibrating screen to receive the separated portions of the granular material and produce movement of a balance or similar device in accordance with the weight of the separated portions. In the past this movement has been used to control the addition of an additive to the granular material from which the sample is taken to provide granular material with a predetermined moldability. This prior apparatus is illustrated and more fully discussed in commonly owned co-pending applications Serial No. 83,074, filed January 16, 1961 and Serial No. 97,862, filed March 23, 1961 now Patents No. 3,136,009 and No. 3,136,010, respectively.

An object of the present invention is to provide granular material conditioning apparatus including improved means for separating the sample of granular material into portions in accordance with the moldability of the granular material as defined in the above referenced patent applications.

Another object is to provide granular material conditioning apparatus including improved means for feeding a sample of granular material from a mill in which it is being conditioned to separating structure for the sample of granular material.

Another object is to provide granular material conditioning apparatus including structure for compensating a sample of the granular material being conditioned for the relatively short travel thereof through sample separating structure in comparison to the relatively long travel of conditioned granular material to the place of use of the conditioned granular material from the granular material conditioning apparatus.

Another object of the invention is to provide granular material conditioning apparatus comprising, a mill for mixing granular material, structure for separating a sample of granular material fed thereto into portions in accordance with the moldability thereof including a plurality of vibrated vertically spaced troughs having slots spaced longitudinally thereof through which granular material is passed vertically between the troughs as it is advanced longitudinally of the troughs due to vibration thereof, means for feeding a sample of the granular material in the mill to the separating structure, means for feeding an additive to the mill and means operably associated with the separating structure and responsive to the quantity of granular material in the portions into which the granular material is divided for controlling the addition of the additive to the mill.

Another object is to provide structure as set forth above wherein the troughs of the sample separating structure include portions longitudinally adjustable to determine the width of the slots.

Another object is to provide structure as set forth above wherein the sample separating structure includes troughs having separate portions which separate portions have successively lower bottoms in the direction of travel of granular material through the sample separating structure.

Another object is to provide granular material conditioning apparatus as set forth above and further including means for compensating for the relatively short distance which the sample of granular material travels through the sample separating structure in comparison to the relatively long distance of travel of conditioned granular material to a place of use thereof.

Another object is to provide granular material conditioning apparatus as set forth above wherein the additive is added to the mill in a plurality of stages and the first stage is controlled in accordance with the load on the mill motor.

Another object is to provide granular material separating structure including a first trough having portions spaced apart axially thereof to provide a slot therebetween through which a sample of granular material placed in the trough is discharged, a second trough positioned beneath the first trough having three separate portions in longitudinally spaced relation providing slots therebetween, the first of which portions is positioned to receive the granular material from the slot in the first trough and a third trough positioned beneath the second trough for receiving the granular material passing through the slots in the second trough at different locations thereon and having aligned transverse openings in the sides thereof on opposite sides of the slot between the second and third portions of the second trough.

Another object is to provide apparatus for compensating for the relatively short distance which a sample of granular material travels in granular material separating apparatus or the like as compared to the distance granular material travels between conditioning apparatus therefor and the place of use thereof comprising a trough through which the sample of granular material is traversed, a chimney positioned above said trough, a hot air chamber positioned below said trough in alignment with said chimney, openings in the bottom of said trough between said chamber and chimney, means for feeding hot air under pressure into said chamber and a plurality of baffles positioned within said chimney.

Another object is to provide improved apparatus for withdrawing granular material from a mill including an opening in the mill, a rotatable spring auger inserted into the mill through said opening, a guard to prevent deformation of the spring auger within the mill by the granular material therein and means for rotating the rotatable spring auger.

Another object is to provide improved apparatus for withdrawing granular material from a mill including an opening in a wall of the mill, a plate secured within the opening in the wall of the mill having a thickness substantially less than that of the wall of the mill and including an opening therethrough having the exterior edge toward which the granular material is moved during conditioning thereof in the mill bevelled to increase the size of the opening in the plate outwardly of the mill.

Another object is to provide granular material conditioning apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partial view of granular material conditioning apparatus constructed in accordance with the invention shown partly in section and partly broken away for clarity.

FIGURE 2 is an end view of the granular material separating structure of the conditioning apparatus illustrated in FIGURE 1 taken in the direction of arrow 2 in FIGURE 1.

FIGURE 3 is a partial section view of a portion of the granular material separating structure illustrated in FIGURE 2 taken substantially on the line 3—3 in FIGURE 2.

FIGURE 5 is a schematic diagram of the means responsive to the portions of the sample of granular material separated in the separating structure of the granular material conditioning apparatus illustrated in FIGURES 1–4 to control the addition of additive to the conditioning mill.

FIGURE 6 illustrates the use of an air motor for driving the spring auger means for withdrawing the granular material from the mill of the conditioning apparatus illustrated in FIGURES 1–4.

Figure 4:
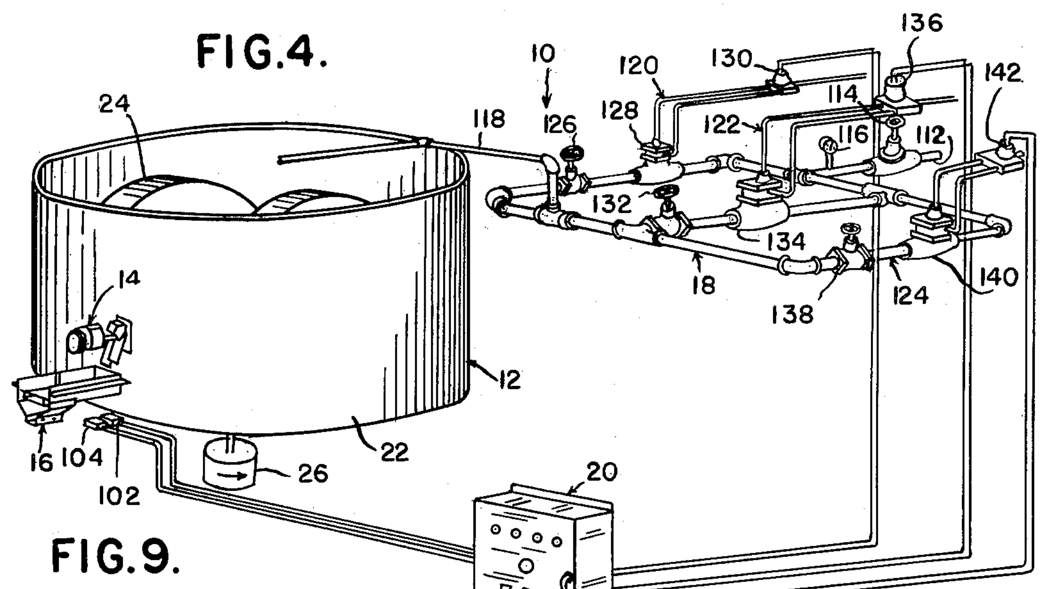
FIGURE 4 is a diagrammatic representation of granular material conditioning apparatus constructed in accordance with the invention.

With particular reference to the figures of the drawings a specific embodiment of the present invention will now be considered in detail.

The granular material conditioning apparatus 10 of the invention includes the mill 12 for mixing granular material, such as foundry sand, with an additive, such as water, to provide granular material having a predetermined moldability, sample feed mechanism 14 for withdrawing a sample of granular material from the mill and sample separating structure 16 positioned to receive the sample of granular material withdrawn from the mill 12 and to separate the sample of granular material in accordance with the moldability thereof. Additive metering means 18 under control of the light responsive apparatus 20 operable to meter additive to the mill 12 in accordance with the moldability of the sample of granular material withdrawn from the mill by the feed mechanism 14 and separated by the separating structure 16 is also part of the granular material conditioning apparatus 10.

In operation of the granular material conditioning apparatus 10 the granular material is mixed in the mill 12 with an additive which is fed to the mill 12 in three stages through the additive metering means 18. The first stage of additive metering is controlled in accordance with the load on the motor 26 of mill 12. In the other two stages of additive metering a sample of the granular material from the mill 12 is withdrawn therefrom by the sample feed mechanism 14 and passed to the sample separating structure 16 where it is separated in accordance with the moldability thereof and electrical signals are developed by the light responsive apparatus 20 in accordance with the moldability of the sample of granular material which electrical signals are used to control the addition of additive to the mill 12.

More specifically the mill 12 is well known in the art and comprises the container 22 in which mixing rollers 24 and scrapers (not shown) are rotated by motor 26 to mix granular material and additive as required to produce conditioned granular material having a predetermined moldability. As shown in FIGURE 1 the container 22 of the mill 12 is provided with an opening 28 in one wall thereof.

The sample feed mechanism 14, as shown in FIGURE 1, includes the spring auger 30 inserted into the container 22 through the opening 28. The auger 30 is secured to the shaft 32 of motor 34 for rotation therewith. A guard 36 is positioned behind the portion of the spring auger 30 within the mill 12, as shown best in FIGURE 1. The guard 36 prevents deformation of the spring auger 30 due to movement of the granular material within the mill 12 on mixing thereof.

The sample feed mechanism 14 further includes the cover member 38 secured to the mill 12 by convenient means, such as screws 40 and chute 42 secured to the mill beneath the opening 28 therein and the cover 38 to receive material withdrawn from the mill 12 on operation of the motor 34 and consequent rotation of the spring auger 30. The sample of granular material thus withdrawn from the mill 12 is passed through the chute 42 to the sample separating structure 16, shown best in FIGURE 1.

Sample separating structure 16 includes an upper trough 44 having elongated portions 46 and 48 which are adjustable longitudinally by means of bolts 50 extending through slots 52 provided in the leg 54 of the angle members 56 which together with the bottom plates 58 make up the portions 46 and 48 of the trough 44. Bolts 50 are secured in the side members 60 of the separating structure 16. It will be particularly noted that the bottom plate 58 of the portion 46 of the trough 44 is higher than the bottom plate 58 of the portion 48 of the trough 44.

Thus in operation, as a sample of granular material is fed into the trough 44 from the chute 42 and is advanced longitudinally of the trough 44 due to vibration of the entire sample separating structure 16 by the vibrator 62, which may be for example a Syntron or similar vibrator, a substantially constant quantity of granular material is fed through the slot 64 provided between the portions 46 and 48 of the trough 44 due to the longitudinal separation therebetween. The flow of granular material through the slot 64 is substantially constant without regard to the quantity of granular material passed longitudinally of the trough 44 providing the bottom of the trough portion 48 is below the bottom of the portion 46 of the trough 44. Such is not the case if the bottoms of the portions 46 and 48 of the trough 44 are aligned or if the bottom of the trough 48 is above the bottom of the trough 44.

The exact phenomenon producing the above results are not understood but appear to have something to do with the fact that the granular material is placed under a bending stress due to the vertical separation of the bottom plates 58 of the trough 44 at the slot 64. At any rate an unusual and unexpected result is obtained by lowering the bottom of the portion 48 of trough 44 which result is to provide a substantially constant flow of material through the slot 64 providing only that more material than will pass through slot 64 is fed to the trough 44 through chute 42.

A second trough 66 is also provided in the sample separating structure 16 having portions 68, 70 and 72, as illustrated best in FIGURE 1. The portions of the trough 66 are spaced apart longitudinally to provide slots 74 and 76 therebetween. Portions 68, 70 and 72 are adjustable longitudinally to change the width of the slots 74 and 76 since they are secured to the members 60 of the material separating structure 16 by the flanges 78, 80 and 82 positioned in the recess 84 in the body members 60. Portions 68, 70 and 72 of trough 66 are secured in adjustable positions by means of the slots 88 therein and bolts 86.

It will be noted that the portion 68 of the trough 66 is positioned to receive the substantially constant portion of the sample of granular material fed to the trough 44 which is discharged from the trough 44 through the slot 64. Further it will be noted that the bottoms of the trough portions 68, 70 and 72 are progressively lower to again provide more uniform feeding characteristics of the granular material from the slots 74 and 76 which characteristics are determined primarily by the width of the slots and the moldability of the granular material received by trough 66.

The granular material separating structure 16 is completed by a third trough 90 secured to the members 60 of the material separating structure by convenient means, such as bolts 92 in the position shown best in FIGURES 1 and 2. The trough 90 is provided with pairs of aligned openings 94 and 96 through the vertical sides thereof. The openings 94 and 96 are positioned on opposite sides of the slot 76, as shown best in FIGURE 1, and permit passage of light from light sources 98 and 100 through the trough 90 to excite the light sensitive elements 102 and 104, shown best in FIGURES 2 and 5, when the granular material received in the trough 90 from slots 74 and 76 is not sufficient to block the passage of light between the pairs of aligned openings 94 and 96.

Thus in operation of the material separating structure 16, with the slots 64, 74 and 76 positioned to a desired width, the vibrator 62 is started and a sample of granular material is fed from the mill 12 into trough 44 at the end 106 thereof. The sample of granular material is traversed longitudinally of the trough 44 due to vibration thereof by the vibrating means 62. A predetermined portion of the sample of granular material is discharged from the trough 44 through the slot 64. The remainder of the sample of granular material proceeds to the end 108 of the trough 44 where it is discharged as unused material. The granular material which is received by the trough 66 is traversed longitudinally thereof again due to vibrator 62. Portions of the granular material traversed longitudinally of the trough 66 are discharged therefrom through the slots 74 and 76. The remainder of the material traversed longitudinally of the trough 66 is discharged from the end 110 thereof. The granular material discharged from the trough 66 through the slots 74 and 76 will be in accordance with the moldability of the granular material of the sample received by the material separating structure 16.

Thus with granular material having a particularly high moldability, as before an additive such as water has been added thereto, a large portion of the sample of granular material will fall through the slot 74 and prevent light from passing between the aligned openings 94 by blocking the intermediate space by granular material lying in the space. Similarly a portion of the sample of granular material will fall through the slot 76 sufficient when combined with that portion of the sample of granular material falling through the slot 74 to prevent light from passing between the sides of the trough 90 through aligned openings 96 by blocking the intermediate space by granular material lying in the space.

On the addition of an additive to the granular material in the mill 12 the moldability thereof decreases and less granular material will be discharged from the chute 66 through the slot 74 until the amount discharged through the slot 74 is sufficiently low so that light is permitted to pass between the aligned openings 94 in the trough 90. Subsequently the moldability of the sample of granular material fed to the material separating structure 16 will be of such a low moldability that the combined granular material passed through the slots 74 and 76 of the trough 66 will be insufficient to block light directed between the aligned openings 96 in the trough 90.

As will be seen subsequently the addition of an additive in the final two stages of operation of the granular material conditioning structure 10, illustrated in FIGURE 4, is controlled through the control of light passing through the aligned pairs of openings 94 and 96 due to the separation of a sample of granular material fed to the granular material separating structure 16.

The means 18 for adding water or other additive to the mill 12 comprises the additive supply line 112 including a cut-off valve 114 and pressure gage 116 therein, the supply conduit 118 to the mill 12 and the three additive control stages 120, 122 and 124, respectively. The additive control stage 120 includes the manual cut-off valve 126, the solenoid operated cut-off valve 128 and the actuating solenoid 130, which as will be subsequently seen is energized in accordance with the load on the mill motor 26. The second additive control stage 122 includes the manual cut-off valve 132, the solenoid operated cut-off valve 134 and the actuating solenoid therefor 136 under control of the light sensitive means 102. Similarly the third additive control stage 124 includes a manual cut-off valve 138, solenoid operated valve 140 and actuating solenoid 142 therefor under control of the light sensitive means 104. The light responsive apparatus 20 and the over-all operation of the granular material conditioning apparatus 10 will be considered in conjunction with the schematic diagram of FIGURE 5.

As shown in FIGURE 5, strip heaters 144 which are secured to the members 60 of the sample separating structure 16 are energized even with the on-off switch 146 of the material conditioning apparatus 14 in the off position. Thus when a cycle of operation is started the material separating structure 16 will be warm so that sticking of granular material fed thereto in the troughs thereof will not occur.

With the on-off switch 146 closed the vibrator 62 may be energized through coil 148, variable resistor 150, rectifier 152 and switch 154, all included in the vibrator 62 and connected in series between the electrical conductors 156 and 158 connected across a source of electrical energy (not shown). Additionally with the switch 146 in the closed position the transformer 160 which supplies operating voltage to the light sources 98 and 100 will be energized and the lamp 162 will be lit indicating energization of the transformer 160.

With the automatic cycle switch 164 in the off position, as shown in FIGURE 5, a cycle of the granular material conditioning apparatus 10 is started by closing the manual start switch 166 to complete a circuit through conductor 168, normally closed contacts T–1 and the relay coil A. On completion of this circuit operating voltages are applied to the amplifiers 170 and 172 connected to the light sensitive elements 102 and 104 to provide an electric signal variable in accordance with the light striking the elements.

At the same time the normally open contacts A–2 in the electrical conductor 158 are closed whereby a circuit is completed between the conductors 158 and 156 through the variable resistance 184, relay solenoid B and the mixer motor 26. Energization of the relay coil B is however insufficient to open the normally closed relay contacts B–1 until the load on the motor 26 has been reduced sufficiently so that a predetermined current will flow through the motor 26 and relay B. Thus, after energizing the relay coil A, water is permitted to pass into the mill 12 through the first additive control stage 120 since the solenoid 130 is actuated to open the valve 128 until contacts B–1 are open and the manual valves 126, 132 and 138 are assumed to be open during a cycle of operation.

While the initial water is being added to the mill 12 through the first additive control stage the time delay TD is energized through the normally closed relay contacts C–2. After the time delay times out the normally open contacts TD–1 are closed to energize the relay coil C. Energizing of the relay coil C causes closing of the normally open contacts C–1 and C–3 and opening of the normally closed contacts C–2. Opening of the contacts C–2 permits recycling of the time delay TD while closing of the normally open contacts C–3 starts the cycle timer T into operation and lights the light 176 indicating a conditioning cycle is in progress.

Normally open contacts C–1 on being closed permit energization of the solenoid 136 through the normally closed contacts D–1 and manual off switch 178 and the lighting of lamp 180 to indicate the addition of additive to the mill 12 through the second additive control stage 122. Similarly closing of the contacts C–1 permits energization of the solenoid 142 through the normally closed relay contacts E–1 and manual off switch 178 and the lighting of lamp 182 to indicate the addition of additive to the mill 12 through the third additive control stage 124.

Additive will be metered to the mill 12 through the first additive control stage 120 until the material in the mixer is of a moldability where the load on the motor 26 is reduced to permit a predetermined current through the relay coil B. At this time which may be adjusted by means of a resistance 184 the addition of additive through the first additive control stage 120 is stopped.

As the moldability of the granular material decreases so that less of the granular material is passed through slot 74 in trough 66 the light source 98 will be permitted to energize the light responsive element 102 through the aligned openings 94, since the light responsive element 102 is no longer shielded by granular material in the trough 90, as shown in FIGURE 2, to create a signal which when it attains a proper magnitude and is amplified through the amplifier 170 will energize the relay coil D and open the normally closed contacts D–1 to deenergize solenoid 136 and stop the addition of additive to the mill 12 through the second additive control stage 122.

Similarly as the moldability of the granular material in the mill 12 approaches the ultimate desired moldability thereof the quantity of granular material received in the trough 90 from the slots 74 and 76 in the trough 66 will not when combined be sufficient to prevent light from source 100 from energizing the light sensitive element 104. On enough illumination of the light sensitive source of electrical energy 104 the electrical signal from amplifier 172 will energize the relay coil E sufficiently so that the contacts E–1 will be opened to deenergize the solenoid coil 142 and halt the addition of additive to the mill 12 through the third additive control stage 124.

No further additive is thereafter added to the mill 12 during the mixing cycle. The timer T however continues to time the cycle and after the mixing cycle is completed will open the relay contacts T–1 to deenergize relay coil A and open contacts A–2 to complete a granular material conditioning cycle.

Thus it will be seen that in accordance with the invention there is provided extremely simple, efficient apparatus for conditioning granular material. Further it will be seen that the apparatus as disclosed above includes a minimum of moving parts and is particularly adjustable to provide granular material having different moldability and to permit use thereof with different granular material.

The modified drive structure of FIGURE 6 is an air motor for use in rotating the spring auger 30. As shown the air motor 186 includes the outer cylindrical shell 188, vanes 190 and the rotor 192 to which the vanes 190 are secured and which is rotatably mounted on shaft 194. In operation air under pressure indicated by the pressure gage 196 is fed through the solenoid operated valve 198 and the manual valve 200 and conduit 202 into the shell 188 where it impinges on the vanes 190 to rotate the rotor in a counterclockwise direction after which it is discharged through the exhaust conduit 204. The advantage of an air motor in the construction illustrated is that should the spring auger 30 become stuck for some reason the air motor 186 will not burn out as the electric motor 34 may.

Figure 9:
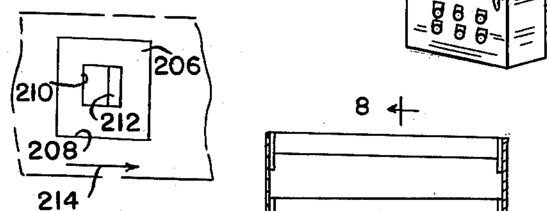
FIGURE 9 is a partial view of the granular material conditioning apparatus illustrated in FIGURE 7 taken in the direction of arrow 9 in FIGURE 7.
Figure 7:
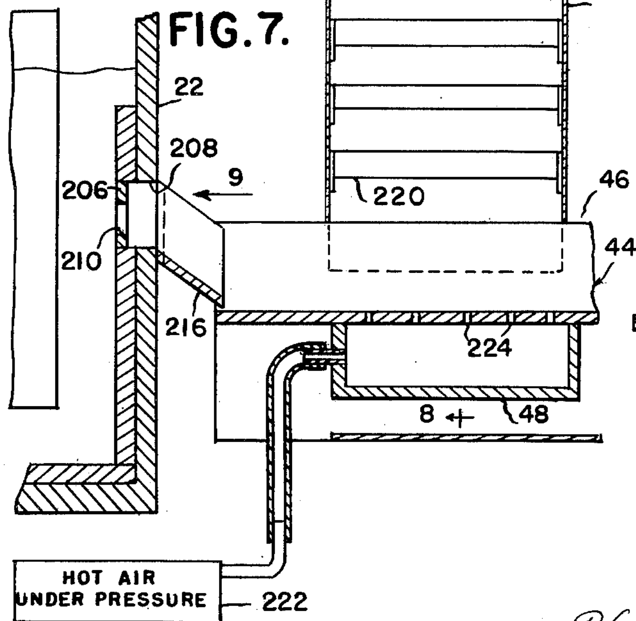
FIGURE 7 is a partial section view of modified granular material conditioning apparatus as shown in FIGURE 1 illustrating alternate means for withdrawing material from the mill and means for compensating for the relatively short travel of granular material through the sample separating structure of the apparatus illustrated in FIGURE 1.

The alternate feed means illustrated in FIGURES 7 and 9 for feeding granular material from the mill 12 to the material separating structure 16 comprises a flat plate 206 secured in an opening 208 in the container 22 which plate 206 is thin relative to the thickness of the container 22. Additionally the plate 206 is provided with the opening 210 therein having a bevelled side 212 in the direction of movement of granular material in the mill 12 on mixing thereof, as indicated by the arrow 214, whereby the opening 210 is enlarged radially outwardly of the mill 12.

Thus with the feed means illustrated in FIGURES 7 and 9 as the wheels 24 are rotated in the mill 12 the granular material is forced out of the opening 210 into the chute 216 to provide a desired specimen for the granular material separating structure 16. The relative dimensions of the plate 206 and container 22, and the sloped side of the opening 210 through the plate 206 are important to prevent the clogging of the opening through the container and consequent restriction of passage of a granular material sample therethrough.

Figure 8:
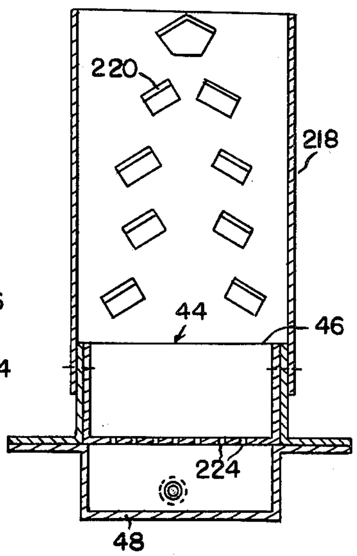
FIGURE 8 is a section view of the granular material conditioning apparatus illustrated in FIGURE 7 taken substantially on the line 8—8 in FIGURE 7.

The means for compensating for the relatively short distance which a sample of granular material travels in the granular material separating structure 16 as compared to the distance which conditioned granular material travels from the mill 12 to a place of use illustrated in FIGURES 7 and 8, comprises a chimney 218 which may be positioned over the portion 46 of a trough 44 of a granular material separating structure, such as structure 16, and a hot air chamber 48 positioned beneath the trough 44. The chimney 218 is provided with the baffles 220 positioned at an angle to the vertical and closer to the sides of the chimney 218 to which they are not attached at the bottom of the chimney than at the top thereof, as shown best in FIGURE 8.

In operation hot air under pressure from source 222 is passed into chamber 48 and from chamber 48 proceeds through a plurality of openings 224 in the bottom of trough 44. Thus the hot air from chamber 48 blows the granular material traversing the trough 44 into the chimney 218 where the granular material contacts the baffles 220 and is dispersed thereby. The chimney will very quickly become saturated with the granular material so that portions of the granular material are returned to the trough and will move along the trough 44. The granular material will be drier and more thoroughly mixed for having been blown into the chimney 218 and deflected by the baffles 220 so as to be more representative of actual conditioned granular material at the place of use than the original sample will be. The exact amount of compensation required in a given instance to provide conditioned granular material from mixer 12 at a place of use having a desired moldability may be determined to some extent by the air temperature and pressure in chamber 48.

While one embodiment of the present invention and modifications thereof have been disclosed in detail it will be understood that other embodiments and modifications of the invention are contemplated. It is the intention to include all embodiments and modifications of the invention within the scope of the invention as defined by the appended claims.

What we claim as our invention is:

1. Granular material conditioning apparatus comprising a mill including rotatable mixing structure, a mill motor connected to the mixing structure for rotation thereof on energization, means for energizing the motor, material separating structure positioned adjacent the mill for receiving a sample of granular material from the mill in one end thereof including a first elongated trough having a first transverse slot thereacross through which a portion of the granular material in accordance with the moldability of the sample of granular material falls on movement of the sample of granular material from the one end toward the other end of the trough, a second trough positioned beneath the first trough for receiving a portion of the sample of granular material falling through said first slot in one end thereof, means connected to the troughs for moving the granular material longitudinally of said troughs from the one end toward the other thereof, sample feed mechanism operably associated with the mill for feeding a sample of granular material to be conditioned from the mill to the separating structure, additive metering means positioned adjacent to the mill for metering additive thereto, a control circuit connected to the motor and additive metering means for controlling the additive metering means in accordance with electric signals received thereby and first light sensitive means connected in the control circuit for producing an electric signal therein to stop addition of additive in one stage of granular material conditioning in the mill in accordance with the light sensed thereby, a first light source connected in said control circuit and directed toward said light sensitive means across said second trough whereby the light falling on the light sensitive means from the first light source and therefore the electric signal produced by the light sensitive means varies in accordance with the level of the granular material passing through said second trough at the first light source and therefore the moldability of the sample of granular material.

2. Structure as set forth in claim 1 and further including a third trough positioned between the first and second troughs and operably connected to the means for moving granular material from one end toward the other of the first and second troughs whereby granular material is moved from one end toward the other of the third trough, said third trough having a second transverse slot thereacross for receiving the granular material from the first slot in the first trough in one end thereof and providing granular material in the one end of the second trough through the second slot therein on movement of granular material received in one end thereof toward the other end thereof.

3. Structure as set forth in claim 2 wherein the third trough further includes a third transverse slot thereacross between said second slot in the third trough and the other end thereof and further including a second light sensitive means connected in the control circuit for producing an electric signal therein to stop addition of additive in another stage of a cycle of granular material conditioning in the mill in accordance with the light sensed thereby, a second light source connected in said control circuit and directed toward said second light sensitive means across said second trough whereby the light falling on the second light sensitive means from the second light source and therefore the electric signal produced by the second light sensitive means varies in accordance with the level of the granular material passing through said second trough at the second light source and therefore the moldability of the sample of granular material.

4. Structure as set forth in claim 3 wherein the electric control circuit includes means responsive to the load on the mill motor for turning off the addition of additive to the mill in still another stage of granular material conditioning in the mill.

5. Structure as set forth in claim 1 and further including means carried by and positioned on the separating structure for compensating the sample of granular material passing through the separating structure for the short distance of travel of the sample of granular material through the separating structure as compared with a relatively long distance granular material from the mill will travel to a point of use.

6. Granular material conditioning apparatus comprising a mill including rotatable mixing structure, a mill motor for rotating said mixing structure, material separating structure positioned adjacent the mill for receiving a sample of granular material to be conditioned from the mill including a first longitudinally extending trough for receiving granular material at one end thereof having a transverse slot thereacross substantially centrally thereof, a second trough positioned beneath the first trough for receiving a portion of granular material passed along said first trough through said slot therein in one end thereof having a second slot extending transversely thereof and a third trough positioned beneath the second trough for receiving granular material in one end thereof from the second slot having transversely aligned openings therein, means for feeding granular material from the mill into the one end of the first trough, means connected to the troughs for moving granular material longitudinally thereof from one end to the other thereof, means adjacent the mill for adding an additive to granular material in the mill, a control circuit connected to the means for adding an additive including a first light sensitive element and a first light source positioned on opposite sides of the third trough adjacent the aligned openings therethrough for producing a first electric signal in the control circuit in accordance with the level of granular material in the third trough at the openings therethrough and means in the control circuit and additive metering means for shutting off additive metered to the mill in a second stage of additive metering to the mill in accordance with the first electric signal.

7. Structure as set forth in claim 6 wherein said second trough includes a third slot extending transversely thereof between said first slot and the other end thereof and said third trough includes a second pair of transversely aligned openings therethrough between the third slot in the second trough and the other end thereof and said control circuit includes a second light source and light sensitive element responsive to the level of granular material in the trough at the second aligned openings therethrough for providing a second electric signal in the control circuit in accordance with the level of granular material in the third trough at the second aligned openings therethrough and means in the control circuit and additive metering means for shutting off additive metered to the mill in a third and final stage of additive metering to the mill in accordance with the second electric signal.

8. Structure as set forth in claim 6 wherein the control circuit further includes a current responsive relay connected in a mill motor energizing circuit portion, a normally closed solenoid is provided in the additive metering means and relay contacts are connected in the control circuit to be opened on a predetermined current in the current responsive relay operable on being opened to deenergize the solenoid operated valve for shutting off additive metered to the mill in an initial stage of additive metering to the mill.

9. Structure as set forth in claim 6 and further including means for compensating for relatively short travel of granular material in the separating structure comprising a chimney positioned over and connected to the first trough, a hot air chamber positioned under the first trough directly below the chimney, openings in the bottom of the first trough between the hot air chamber and chimney, means for feeding hot air under pressure into the hot air chamber and a plurality of baffles in the chimney.

References Cited by the Examiner

UNITED STATES PATENTS

| | | | |
|---|---|---|---|
| 249,978 | 11/1881 | Palmer | 34—132 |
| 299,920 | 6/1884 | Eyre | 73—424 |
| 463,509 | 11/1891 | Hawley | 73—423 |
| 475,557 | 5/1892 | Hawley | 73—423 |
| 751,340 | 2/1904 | Raht | 73—424 |
| 1,713,869 | 5/1929 | Fisher | 22—89 |
| 2,138,297 | 11/1938 | Ekert et al. | 34—132 |
| 2,263,797 | 11/1941 | Christensen | 22—89 |
| 2,452,362 | 10/1948 | Erisman | 22—89 |
| 2,456,769 | 12/1948 | Christensen et al. | 22—89 |
| 2,821,375 | 1/1958 | Andrews | 22—89 X |
| 2,854,714 | 10/1958 | Dietert | 22—89 |
| 2,948,918 | 8/1960 | Austin | 18—1 X |
| 2,977,631 | 4/1961 | Komarek et al. | 18—2 X |
| 2,990,624 | 7/1961 | Granath et al. | 22—89 |
| 3,046,624 | 7/1962 | Dietert et al. | 22—89 |
| 3,136,009 | 6/1964 | Dietert et al. | 22—89 |
| 3,136,010 | 6/1964 | Dietert et al. | 22—89 |
| 3,154,824 | 11/1964 | Dietert | 22—89 |
| 3,161,927 | 12/1964 | Dietert | 22—217 X |

J. SPENCER OVERHOLSER, *Primary Examiner.*

MARCUS U. LYONS, WILLIAM J. STEPHENSON, *Examiners.*